(12) United States Patent
Eakin et al.

(10) Patent No.: US 8,050,983 B1
(45) Date of Patent: Nov. 1, 2011

(54) INHIBITING INAPPROPRIATE COMMUNICATIONS BETWEEN USERS INVOLVING TRANACTIONS

(75) Inventors: Aaron A. Eakin, Redmond, WA (US);
Sebastian Lehmann, Seattle, WA (US);
Peter C. Fang, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 1212 days.

(21) Appl. No.: 11/555,197

(22) Filed: Oct. 31, 2006

(51) Int. Cl.
*G06Q 30/00* (2006.01)
*G06K 5/00* (2006.01)
*G07F 19/00* (2006.01)

(52) U.S. Cl. ............... 705/26.35; 235/379; 235/380

(58) Field of Classification Search ............ 705/26.35; 235/379, 380
See application file for complete search history.

(56) References Cited

U.S. PATENT DOCUMENTS

| | | | |
|---|---|---|---|
| 6,783,065 B2 * | 8/2004 | Spitz et al. | 235/380 |
| 2004/0267612 A1 * | 12/2004 | Veach | 705/14 |
| 2006/0101120 A1 * | 5/2006 | Helsper et al. | 709/206 |
| 2010/0095378 A1 * | 4/2010 | Oliver et al. | 726/22 |

OTHER PUBLICATIONS

Templeton, Brad, "Reflections on the 25th Anniversary of Spam", downloaded Feb. 27, 2011 from http://www.templetons.com/brad/spam/spam25.html.* eBay New Study: "New Study Reveals 724,000 Americans Rely on eBay Sales for Income", press release dated Jul. 21, 2005, downloaded Mar. 19, 2011 from http://investor.ebay.com/releasedetail.cfm?releaseid=170073.* eBay.com, "Answering Buyers' Questions," downloaded Jan. 9, 2007, from http://pages.ebay.com/help/sell/answer_qs.html, 2 pages.

eBay.com, "Contacting eBay Members," downloaded Jan. 9, 2007, from http://pages.ebay.com.sg/help/tp/contacting-members.html, 2 pages.

Steiner, I., "ChannelAdvisor Says eBay's 'Ask Seller a Question' Costs Sellers Money," Jan. 4, 2006, Auctionbytes-NewsFlash, No. 1187, downloaded Jan. 9, 2007, from http://www.auctionbytes.com/cab/abn/y06/m01/i04/s02, 2 pages.

* cited by examiner

*Primary Examiner* — Donald L. Champagne
(74) *Attorney, Agent, or Firm* — Seed IP Law Group PLLC

(57) ABSTRACT

Techniques are described for automatically identifying and inhibiting suspect electronic communications between users, such as for electronic communications that may reflect fraudulent activities by one or more of the users or that are otherwise inappropriate for one or more reasons. In some situations, the communications may relate to transactions in which the users are involved, such as for users that are buyers and sellers of items interacting via one or more electronic marketplaces. The communications may occur via a communication mechanism provided by an electronic marketplace that acts as an intermediary between the sender of a communication and the one or more intended recipients of the communication. The automatic identification of suspect communications that may be inappropriate includes automatically assessing the communications in one or more ways, and identified suspect communications and any associated inappropriate user activities may be inhibited in various ways.

51 Claims, 9 Drawing Sheets

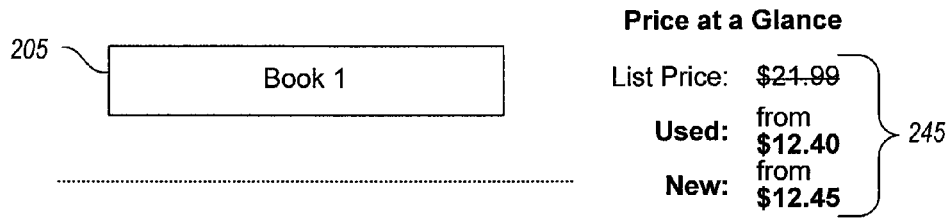

Example Listing of Sellers for Selected Product

205 — Book 1

Price at a Glance

List Price: ~~$21.99~~
Used: from $12.40
New: from $12.45
} 245

All   New (1 from $12.45)   Used (2 from $12.40)

| All | (1 to 3 of 3) | | | |
|---|---|---|---|---|
| Price (215) | Condition (220) | Seller/Rating (225) | Offer Details (230) | Ready to buy? |
| $12.40 ☑ LOW PRICE | Used - Like New  Comments: Brand New, Perfect Condition, Please allow 4-14 business days for delivery. 100% Money Back Guarantee, Over 1,000,000 customers served. | Seller: Bob_Smith  Rating: ☆☆☆☆☆ 90% positive ratings over the past twelve months (24092 ratings). Seller has 25756 lifetime ratings. | • In Stock. • Ships from MD, United States • International shipping available • See shipping rates | [Add to Cart] 235a  or  Contact this seller  240a |
| $12.41 | Used - Good  Comments: Medium wrinkle or bend on back. Medium wrinkle or bend on front. Never read copy. | Seller: Imay Dwrinkle  Rating: ☆☆☆☆☆ 96% positive ratings over the past twelve months (95463 ratings). Seller has 141787 lifetime ratings. | • In Stock. • Ships from , United States • Expedited shipping available • See shipping rates | [Add to Cart] 235b  or  Contact this seller  240b |
| $12.45 | New  Comments: Brand new. | Seller: Bob_Smith  Rating: ☆☆☆☆☆ 90% positive ratings over the past twelve months (24092 ratings). Seller has 25756 lifetime ratings. | • In Stock. • Ships from MD, United States • International shipping available • See shipping rates | [Add to Cart] 235c  or  Contact this seller  240c |

Current time: 2:09 a.m.; July 31, 2xxx

Contact Seller > Bob_Smith

Type your question below, and we will forward it to the seller and e-mail you a copy.

When you submit this form, your message will be sent to the seller. Any response from the seller will be forwarded to you.

⎛ 275      ⎛ 270
( Cancel )   ( Send )

Your E-mail to Bob_Smith:

245 — To:        Bob_Smith
250 — From:      A. Customer (ACustomer@foreigncountryX.net)
255 — Item:      Book 1
260 — Subject:   Payment Comments:

265 ⎰ I would like to buy this book.  Do you
      accept money orders from ForeignCountryX?
      I do not have a credit card.

Please contact me at
      ACustomer@foreigncountryX.net

*Fig. 2B*

| Keyword | Keyword Score |
|---|---|
| "money order" | 84 |
| ForeignCountryX | 68 |
| ForeignCountryY | 56 |
| payment | 27 |
| shipping | -42 |
| vacation | -31 |
| wrinkle | -23 |

*Fig. 2C*

Prior Communication #1

```
To:        Seller_Ted

Sent:      July 27, 2xxx; 02:11

From:      A.Customer

Subject: Payment

I would like to buy this book.  Do you accept
money orders from ForeignCountryX?  I do not have
a credit card.
```

Similarity Score: 100

*Fig. 2D*

Prior Communication #2

```
To:        Seller_Joe

Sent:      July 22, 2xxx; 03:59

From:      Frank Adams

Subject: Payment

My brother's money order is perfectly valid.
```

Similarity Score: 72

*Fig. 2E*

Prior Communication #3

```
To:        Seller_Ted

Sent:      November 18, 2xxx; 13:21

From:      Mary Smith

Subject: Shipping

Could you hold off shipping my book until January
3rd?  I don't want the UPS guy to leave it on my
porch while I'm on vacation.  Thanks.
```

*Fig. 2F*                    Similarity Score: 9

Current time: November 19, 2xxx; 08:07

Communication #3b                ( Cancel )  ( Send )

```
To:  MarySmith123457@marketplaceXXX.com               280

Subject: RE:  Shipping

Yes, I can do that.  Would you like me to ship
your item on January 3rd or would you like to
receive it on January 3rd?    -Ted
```

*Fig. 2G*

Current time: November 19, 2xxx; 12:31

Communication #3c                ( Cancel )  ( Send )

```
To:  Seller_Ted793456@marketplaceXXX.com              285

Subject: RE:  Shipping

Hi, Ted.  If you could time it so that I receive
my book on the 4th or the 5th, that would be
perfect.

Thanks!  Mary
```

*Fig. 2H*

INHIBITING INAPPROPRIATE COMMUNICATIONS BETWEEN USERS INVOLVING TRANACTIONS

TECHNICAL FIELD

The following disclosure relates generally to techniques for automatically inhibiting inappropriate communications between users engaged in transactions, such as communications that are exchanged between users acting as buyers and sellers of items via an intermediary third-party electronic marketplace and that reflect at least potentially fraudulent activities by one or more of the users involved in the communications.

BACKGROUND

The Internet comprises a vast number of computers and computer networks that are interconnected through communication links, with information being exchanged using various services such as electronic mail, FTP, and the World Wide Web (also referred to as the "Web"). The Web allows a server computer system (e.g., a Web server providing a Web site) to send graphical Web pages of information to a remote client computer system, which the remote client computer system may then display, such as via a Web browser executing on the client computer system.

In addition to merely providing access to information, the Web has increasingly become a medium that is used to search for, shop for and order items (such as products, services and/or information) that are for purchase, rent, lease, license, trade, evaluation, sampling, subscription to, etc. In many circumstances, a user can visit the Web site of a Web merchant (or a "Web store") or otherwise interact with an online merchant or retailer or electronic marketplace that provides one or more items, such as to view information about the items, give an instruction to place an order for one or more items, and provide information needed to complete the purchase (e.g., payment and shipping information). After receiving an order for one or more items, a Web merchant then fulfills the order by providing the ordered items to the indicated recipient. The items may be products that are delivered electronically to a recipient (e.g., music downloaded over the Internet), or through physical distribution channels (e.g., paperback books shipped via a governmental postal service or private common carrier). The items may also be services that are provided either electronically (e.g., providing email service) or physically (e.g., performing cleaning services at the house of the purchaser). The order fulfillment process typically used by Web merchants for product items that are to be physically provided shares similarities with other item ordering services that ship ordered items (e.g., catalog-based shopping, such as from mail-order companies), such as to deliver ordered items from one or more physical distribution or fulfillment centers operated by or on behalf of the Web merchant.

The Web and other communication networks enable various types of electronic commerce to occur, including via various types of electronic marketplaces. Such electronic marketplaces are each typically made up of numerous users acting as buyers and sellers of various items (or users acting as other types of potential providers and acquirers of items for types of transactions other than purchases, such as renters and rentees for rental transactions, etc.). For example, a seller may offer one or more items to buyers via one or more types of purchase transactions, such as via a fixed-price offer to the first buyer that agrees to pay the price, via an auction to the buyer that offers the highest price and/or that otherwise satisfies specified criteria, etc. In such environments, buyers and sellers may communicate with each other regarding transactions for various purposes, such as to seek information in furtherance of a potential transaction, to place an order for a particular item as part of an actual transaction, to arrange for delivery of a previously ordered item, etc. Such communications often take place between parties who have no previous familiarity with each other, and may occur in various ways, such as via email or other electronic communication mechanisms provided via an electronic marketplace, or using communication mechanisms that occur external to an electronic marketplace.

Although such electronic commerce may provide many benefits, various problems may still arise. For example, unscrupulous buyers may attempt to engage in various types of fraudulent activities, such as by submitting orders without providing valid payment (e.g., using fraudulent money orders, stolen credit cards, etc.), attempting to obtain personal information about sellers, etc. Furthermore, such buyers may perform various types of communications with sellers as part of or to further such fraudulent activities, and also may attempt to use communications performed via an electronic marketplace to direct further communications to occur outside the electronic marketplace (e.g., to avoid protections provided by or fees charged by the electronic marketplace). Communications that reflect or further fraudulent activities may further be sent from sellers to buyers, such as by sellers attempting to defraud buyers, or by other users that obtain unauthorized access to sellers' accounts on an electronic marketplace and then impersonate the sellers. If an unscrupulous user obtains access to a seller's account, the user may gain access to contact information (e.g., email addresses) and other information for buyers with whom the seller has previously interacted, which the user may then use for various types of fraudulent activities (e.g., to "phish" for other confidential information about the buyers). Thus, various types of fraudulent activities may occur between users in electronic marketplaces, at least some of which are furthered by electronic communications between the users.

Thus, it would be beneficial to provide techniques to inhibit fraudulent activities related to electronic commerce, including by inhibiting electronic communications that reflect or further such fraudulent activities, as well as to provide other benefits.

BRIEF DESCRIPTION OF THE DRAWINGS

FIGS. 2A-2H illustrate examples of automatic assessment of electronic communications between users involved in transactions.

DETAILED DESCRIPTION

Figure 1:
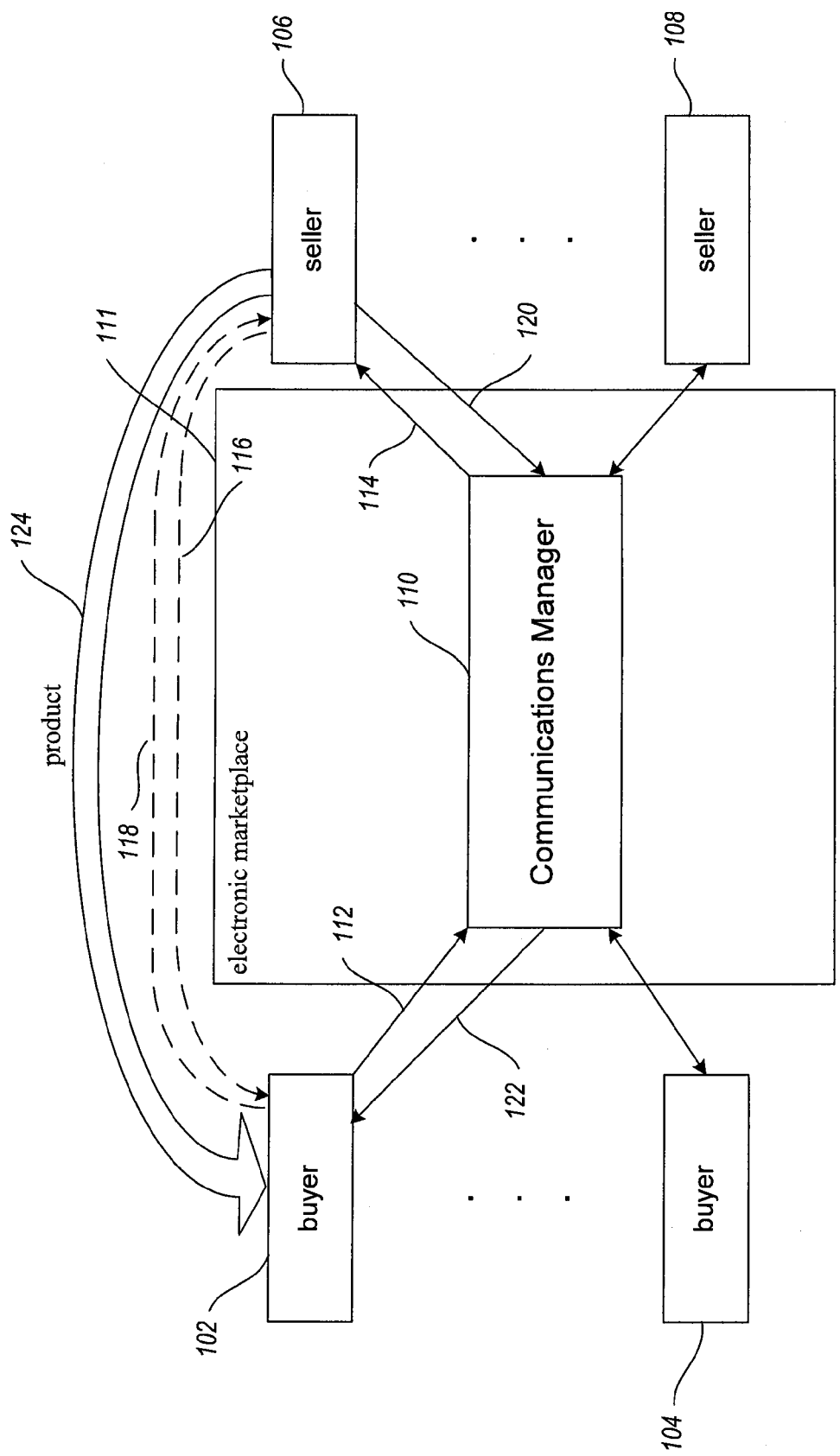
FIG. 1 is a network diagram illustrating an example of interactions between buyers and sellers via an electronic marketplace.

Techniques are described for automatically identifying and inhibiting suspect electronic communications that may be inappropriate for one or more reasons. In at least some embodiments, the techniques are used for communications between users engaged in potential and/or actual transactions, such as to automatically inhibit inappropriate activities by one or more of the users involved in the communications. The users may, for example, be buyers and sellers of items that are interacting via one or more electronic marketplaces, and in some embodiments the communications may occur via a communication mechanism provided by an electronic marketplace acting as an intermediary between the sender of a communication and the one or more intended recipients of the communication. The inappropriate activities of the users may in some embodiments and situations include various types of attempted fraudulent activities, and in some embodiments and situations may include other types of inappropriate activities, such as abuse of privileges (e.g., by taking actions that violate an agreement or restrictions that apply to a user, such as based on sending an excess volume of communications or sending communications with inappropriate content). The automatic identification of suspect communications that may be inappropriate includes automatically assessing the communications in one or more ways, as discussed in greater detail below, and identified suspect communications and any associated inappropriate user activities may be inhibited in various ways, as is also discussed in greater detail below. Various types of communications between users may also further be tracked in at least some embodiments to provide various other types of capabilities related to the communications. In at least some embodiments, the described techniques are performed by an embodiment of an automated Communication Manager system, as discussed below.

As noted above, in at least some embodiments, electronic communications between users may occur via an intermediary, such as via an electronic marketplace with which the users interact. While users may be involved in a variety of types of transactions using various types of intermediary electronic marketplaces, the following discussion will, for the sake of simplicity, refer generally to users that are "buyers" and "sellers," although it will be understood that the illustrated techniques may similarly be used with other types of users engaged in other types of transactions via other types of electronic marketplaces or other intermediaries, and that the terms "buyer" and "seller" may include users that have not yet completed a purchase/sales transaction (e.g., so as to include potential buyers and sellers that are negotiating or otherwise considering a potential transaction, or that have partially completed such a transaction). In such embodiments with buyer and seller users interacting via an intermediary electronic marketplace, the communications may be initiated when a buyer or seller acts as a sender of an electronic message or other electronic communication (e.g., an email, instant message, text message, automated telephone or other voice message, etc.) by submitting the electronic communication to the electronic marketplace with an indication of one or more intended recipients, with the electronic marketplace then forwarding the electronic communication to the intended recipients of the electronic communication on behalf of the sender. In such situations, the electronic addresses (e.g., email addresses for email communications) of the users may be protected since the intermediary electronic marketplace performs the communication forwarding, such that a sender of a communication may be able to indicate one or more intended recipients without having access to their electronic addresses (e.g., by indicating login names or other unique identifiers for the recipients), and such that a recipient of a communication may be allowed to reply to the communication sender via the intermediary but without having access to the electronic address of the sender.

In embodiments in which electronic communications are submitted to an intermediary, the forwarding of a communication by the intermediary to some or all of the intended recipients may be blocked or otherwise prevented, however, if the communication is determined to be a suspect communication. Furthermore, various additional actions may further be taken to inhibit any fraudulent or otherwise inappropriate activities associated with a suspect communication. Unless indicated otherwise, discussions below of blocking or other responses that reflect suspected fraudulent activities similarly apply in at least some embodiments to other types of inappropriate activities. Alternatively, in other embodiments, communications may be monitored and identified as suspect without blocking suspect communications from being delivered and/or without taking additional actions to inhibit potential associated fraudulent activities, with suspect communications being forwarded to the intended recipients (e.g., if the communication assessment occurs after the communication has been forwarded to some or all of the intended recipients). In such embodiments, however, the forwarded suspect communications may optionally be flagged for the intended recipients as being suspect or the intended recipients and/or the sender may otherwise be notified of the identification of the communication as being suspect.

Communications to be assessed may be obtained in various ways in various embodiments. For example, if an electronic marketplace acts as an intermediary for communications between users, the electronic marketplace may select some or all of the communications to be assessed, with the assessment to be performed by the electronic marketplace or by a third-party system performing the assessment as a service provided to the electronic marketplace. The selection of communications may be performed in various ways in various embodiments, including by selecting all communications, selecting only communications that meet specified criteria or do not meet specified criteria (e.g., to exclude communications that are known to be legitimate, such as if initiated at least in part by the electronic marketplace, or for communications that are responses to prior communications assessed as not being suspect), etc. The electronic marketplace may obtain communications from senders by, for example, providing Web forms in which textual and/or other content may be supplied for an electronic communication. For example, such a Web form may be presented to a buyer who desires to send a communication to a seller, such as to initiate an order for an item provided by the seller or to initiate contact with the seller in order to gather more detailed information about the item or about other information regarding the seller. After the buyer submits the communication, it may be forwarded as an email to the seller through use of a standard email interface, which the seller may retrieve using a third-party email client program, or the communication may instead be retained at the electronic marketplace for retrieval by the seller. The seller may then respond to the buyer in various ways if so desired. For example, the communication may be provided with an associated response address that corresponds to the electronic marketplace, but with the communication provided so as to include unique information that the electronic marketplace may use to identify the buyer sender (e.g., a unique ID for the buyer or a unique ID for the original communication that may be associated with the buyer). If so, the response communication from the seller will be directed to the electronic marketplace, and then forwarded to the buyer by the electronic marketplace as appropriate. Alternatively, in some embodiments, some or all additional communications after a first communication occur "out of band" without using the electronic marketplace as an intermediary, such as if the seller is provided with the buyer's email address and may then respond to the buyer directly. Communications to be assessed may also be obtained in various other ways in embodiments in which the communications do not occur via an intermediary electronic marketplace, such as by obtaining the communications from the senders or recipients (e.g., via client programs executing on computing systems used by the senders and/or recipients, such as client programs provided to users by an electronic marketplace when the users register as buyers or sellers; by intercepting communications in various ways, such as with the assistance of third-party communication systems that enable the communications; etc.).

After a communication is obtained to be assessed, it may be automatically assessed in various ways, such as based at least in part on the contents of the communication. For example, in some embodiments the contents of the communication may be compared to one or more predefined keywords, such as keywords previously identified as corresponding to (e.g., statistically correlated with) inappropriate communications identified as being associated with fraudulent or other inappropriate activities and/or corresponding to communications previously identified as not being inappropriate. If so, the presence in a communication being assessed of one or more keywords corresponding to inappropriate communications may indicate a higher likelihood that the communication is suspect, while the presence of one or more keywords corresponding to appropriate communications may indicate a lower likelihood that the communication is suspect.

In some embodiments, the contents of a current communication being assessed may be compared to the contents of prior communications, whether instead of or in addition to using predefined keywords. For example, the current communication may be compared to prior communications sent by the same user over a predefined prior period of time, such as if a large number of similar emails from a user reflect an increased likelihood of fraudulent activity on the part of the user. Alternatively or additionally, the current communication may be compared to prior communications sent by other users over a predefined prior period of time, such as to compare a current communication to prior communications identified as being inappropriate in order to increase the likelihood of the current communication being suspect if the current communication is similar, or to decrease the likelihood if the current communication is similar to prior communications identified as being appropriate (or if it is not similar to inappropriate prior communications). Such comparison to other prior communications from other senders may further identify similar or identical communications being sent from multiple senders, such as may reflect that the multiple senders are actually a single user that is fraudulently impersonating multiple different senders, or that may reflect multiple distinct sender users that are inappropriately working together in collusion. Comparison between various communications may be performed in various ways in various embodiments, such as on a word-by-word basis, by comparing a predefined number of words at a time, by comparing predefined groupings of words (e.g., sentences, paragraphs, pages, etc.) at a time, etc. Suspect content of communications (e.g., as reflected in differences in the content of current communications relative to prior communications) may reflect, for example, unscrupulous buyers that attempt to send communications to various sellers in at attempt to convince them to accept fraudulent money orders or other fraudulent forms of payment. Such communications may be performed by the actual buyers (e.g., by users that create new buyer accounts at an electronic marketplace for such purposes, typically with inaccurate information about the users) and/or by other users that have obtained unauthorized access to accounts of legitimate buyers. Likewise, an unscrupulous user who has obtained unauthorized access to a seller's account on the electronic marketplace may attempt to submit communications with the intent to gain access to buyers' confidential information, such as financial information (e.g., credit card and/or bank account numbers) and other personal information.

Another technique for assessing communications to identify suspect communications includes monitoring the volume of communications sent by a particular user over a predefined prior period of time, as large numbers of communications may in some circumstances reflect inappropriate activities other than fraud on the part of the communication senders. Such volume-based assessment may be performed instead of or in addition to one or more fraud assessment techniques. For example, buyers and/or sellers may attempt to send a high volume of communications that are unwanted by the recipients (e.g., "spam"), or may send communications which attempt to redirect the recipients to different marketplace or other Web site. Such communications may be sent by users that have obtained unauthorized access to accounts of legitimate other users, or by the actual other users. Therefore, an unusually high volume of communications sent by a particular user in a relatively short period of time may indicate that the current communication from the user is suspect. However, some users may also in some situations send large numbers of legitimate communications, such as for a high-volume seller as part of the normal course of business or as part of a new promotion. Thus, to assess the volume of recent communications submitted by a particular user, the volume may in some embodiments be compared to the volume of communications previously submitted by the same user and/or to the volume of communications submitted by other users of a similar type (e.g., if the user is a buyer, to other buyers with similar purchase habits, or if the user is a seller, to other sellers of similar sales volume or other similar characteristics). For example, a buyer user may be limited to at most 20 email communications per hour and/or 100 email communications per day, with additional communications beyond those thresholds being treated as suspect. In some embodiments, the volume of communications may instead be assessed relative to a predefined volume threshold, such as a single volume threshold used for all communications, or differing volume thresholds depending upon one or more characteristics of the sender and/or of the communication. In other embodiments, a volume of communications less than a volume threshold may also indicate inappropriate activity.

In addition, in some embodiments, other information particular to a user submitting a communication may be used in assessing whether the communication is suspect. For example, prior activities of a user may be used as part of assessing whether a communication from a user is suspect, such as the length of time that the user has been registered with the marketplace and/or a number of prior transactions engaged in by a user. As one example, communications submitted by a new user may be more likely to be suspect than communications submitted by a user with a longer history of involvement with the marketplace. In addition, in some embodiments information specific to one or more intended recipient users for a communication may be used in assessing whether the communication is suspect.

In some embodiments, the assessment of a communication includes generating a fraud assessment score and/or other inappropriateness assessment score for the communication, and then determining that the communication is suspect if the generated assessment score(s) meet and/or exceed a predefined threshold. The fraud assessment score may be generated in various ways, such as based on using one or more of the previously described assessment techniques. For example, one of more fraud assessment tests may be applied to the communication, with each fraud assessment test using one or more of the previously discussed assessment techniques. If so, the results of the one or more fraud assessment tests may be aggregated in various ways to produce the fraud assessment score. For example, each fraud assessment test may produce an individual test score, and the individual test scores may be combined in a weighted manner by using a weight assigned to each fraud assessment test that is applied. In addition, a fraudulence threshold to use may be determined in various ways, including by using a single predefined fraudulence threshold for all communications, or by selecting one of multiple predefined or otherwise generated fraudulence threshold for a communication based on information about the communication (e.g., in a manner similar to that previously discussed with respect to volume-based thresholds). Like volume thresholds, fraudulence thresholds may be uniform for all users and communications, or may differ depending upon one or more characteristics of the user submitting the communication and/or upon one or more characteristics of the communication itself.

Once a communication has been assessed as being suspect, various types of actions may be taken in various embodiments to inhibit the suspect communication and/or any associated fraudulent or otherwise inappropriate activities by the communication sender or others. For example, in some embodiments a suspect communication may be permanently blocked so as to prevent the communication from being forwarded or otherwise delivered to one or more of the intended recipients. In some embodiments, the forwarding of a suspect communication may first be delayed in order to allow additional data to be gathered to assist in assessing the communication. For example, if one or more volume-based assessment tests and/or tests to assess similarity of a current communication to other communications are in use, the delay may be used to obtain additional communications to which the current communication will be compared at a future time. In some embodiments, upon receipt of a suspect communication from a sender that is directed to one or more intended recipients, the Communications Manager system sends a confirmation email or other communication to the sender. During the delay for the suspect communication, the additional information that becomes available regarding the communication may include a determination of whether the confirmation communication is received by the sender, such as based on whether the sent confirmation communication is returned as undeliverable (which would typically indicate an invalid destination email address or other communication address for the sender). An invalid sender communication address may provide further support that the communication being delayed is suspect. Furthermore, in some embodiments the delay may be performed for some or all received communications even if the communications have not being identified as being suspect at the time of the delay, such as to gather additional delay-related information for all received communications as part of the assessment process. In some embodiments, a suspect communication may be automatically modified (e.g., to remove content that contributes to the communication being suspect and/or that introduces security or other risks), and the modified version of the communication may be forwarded to one or more of the intended recipients for the suspect communication. The user submitting the communication may in some embodiments be advised that the communication was modified before forwarding. Furthermore, if the user is advised in advance of the communication modification, the user may in some embodiments be presented with an opportunity to choose between approving or accepting the offered modification to be sent or instead canceling the suspect communication. In addition, when a suspect communication is blocked, the sending user may in some embodiment be notified that the communication was blocked, while in other embodiments the sender may not receive any notification or may be sent a confirmation that falsely indicates that the communication was forwarded to the intended recipient (e.g., so that a user engaged in fraudulent activities will not be aware that his/her fraudulent activities have been detected, and thus possibly attempt to modify the fraudulent activities to avoid further detection).

In addition, additional actions may be taken in some embodiments and situations, such as to freeze or shutdown a user account from which one or more suspect communications have been sent (e.g., for a new user account, an account that is believed to have been compromised by unauthorized access, etc.), such as permanently or until assurances are received that the account has not been compromised. For example, unexplained changes in activities for a particular user may indicate that the user's account has been compromised. Furthermore, in some embodiments, additional activities may be taken, such as notifying recipients of prior communications from a user that is identified as being potentially engaged in fraudulent activities in order to warn of the potential fraud, and further inhibiting additional inappropriate activities by the user (e.g., by contacting legal authorities, by interacting with a service provider or other electronic communication service used by the user, etc.).

In addition, information about previously received communications may be stored in some embodiments for various purposes. First, prior communications may provide a basis for comparison with current communications, as previously discussed. Second, prior communications sent between buyers and sellers may provide information that is of use in resolving disputes between the buyers and sellers, such as to enforce guarantees and other promises. Third, an electronic marketplace may use prior communications to track a variety of statistics relating to the user who submitted them. For instance, a seller's level of responsiveness may be tracked based on the length of time between the placement of an order and acknowledgement of the order, or the length of time to respond to a buyer's complaint. As another example, the number of times that a buyer lodges complaints against various sellers may also be determined. A variety of additional uses may be made of previously received and/or assessed communications.

For illustrative purposes, some embodiments are discussed below in which particular types of electronic communications are automatically assessed in particular ways, and in which communications determined to be suspect are automatically handled in various ways. However, it will be appreciated that the invention is not limited to the details of these example embodiments, and that the described techniques may be used in a wide variety of other situations, including with communications sent in contexts other than via an electronic marketplace.

FIG. 1 illustrates an example of interactions between buyers and sellers via an electronic marketplace 111, and of an embodiment of a Communications Manager system 110 that automatically identifies and inhibits suspect electronic communications between the buyers and sellers. In particular, various buyers 102 and 104 interact with the electronic marketplace 111 for the purpose of shopping for and/or ordering product and/or service items from various sellers 106 and 108. In this embodiment, the electronic marketplace acts as an intermediary for the communications between the buyers and sellers, and the Communications Manager system is operated by the electronic marketplace to assess the communications, although in other embodiments the Communications Manager system may operate separately from the electronic marketplace and the assessed communications may occur without the electronic marketplace acting as an intermediary for the communications.

As one example of possible interactions, buyer 102 may desire to place an order from seller 106 for one or more items offered by seller 106 or to contact seller 106 with one or more queries related to such items. The electronic marketplace in this example provides capabilities (not shown) for buyer 102 to send communications to seller 106, although in other embodiments such capabilities may be provided by the Communications Manager system and/or one or more external communication systems. Buyer 102 then submits a communication 112 intended for seller 106, which is forwarded to the Communications Manager system 110. If Communications Manager 110 determines that communication 112 is not suspect, Communications Manager 110 directs that communication 112 be forwarded 114 to seller 106. On the other hand, if Communications Manager 110 determines that communication 112 is a suspect communication, communication 112 may be blocked from being forwarded to seller 106 and/or may be forwarded after being modified by Communications Manager 110.

In this example, seller 106 then initiates a response to the communication 112 from buyer 102. In some embodiments, seller 106 may be allowed to respond directly to buyer 102 by sending one or more communications 116 without using the electronic marketplace as an intermediary, and if so Communication Manager 110 may not assess communication(s) 116. Similarly, buyer 102 may be allowed to send subsequent related communications (e.g., responses) directly to seller 106 by sending one or more communications 118 without using the electronic marketplace as an intermediary, and Communication Manager 110 may similarly not assess the communication(s) 118. In other embodiments, some or all additional communications after communication 112 may occur using the electronic marketplace as an intermediary and with Communication Manager 110 assessing those additional communications. For example, seller 106 may instead respond to buyer 102 by sending communication 120 intended for buyer 102, which is assessed by Communications Manager 110 and forwarded 122 to buyer 102 if communication 120 is not determined to be suspect. Alternatively, if Communications Manager 110 determines that communication 120 is suspect, communication 120 either may not be forwarded to buyer 102 or may be forwarded after being modified by Communications Manager 110.

In addition, rather than buyer 102 initiating a first communication as in the example above, seller 106 may instead initiate a first communication with buyer 102 (not shown) via the electronic marketplace, which Communications Manager 110 would receive and assess as described above. Additional communications between the buyer and seller may then occur as described above.

Regardless of who initiates the first communication, if the communication(s) result in an order being placed, seller 106 may then ship 124 an ordered product item to the buyer 102 via one of various physical distribution mechanisms, or may otherwise provide electronic product items or service items to the buyer or other designated recipient (not shown). While not illustrated here, the Communications Manager system 110 may further assess a variety of other types of communications, including communications between buyers and buyers, communications between sellers and sellers, communications from and/or to the electronic marketplace, communications from and/or to other external parties that are not buyers or sellers, etc. In addition, a variety of other types of interactions may occur between users of the electronic marketplace and/or external parties as part of regular operation of the electronic marketplace.

FIGS. 2A-2H illustrates examples of automatic assessment of electronic communications between users involved in potential and/or actual item transactions, such as communications that may occur between buyers 102 and 104 and sellers 106 and 108 of FIG. 1. The assessment of the communications may be performed by, for example, the Communications Manager 110 of FIG. 1.

For example, FIG. 2A illustrates an example of information that may be provided to a user who is a potential buyer customer of a Web store electronic marketplace, such as via a Web page provided to a client computing system of the user for display to the user. In this example, the Web page is displayed after the user has selected a particular product item of interest, but before placing an order for the selected product.

In this example, the displayed information includes an indication of the selected product 205 (which is a book in this example), entries 210a-210c indicative of sellers offering the selected product, and aggregate pricing information 245 related to the selected product. The entry 210 for each seller includes a price 215 at which the seller is offering the selected product, a condition 220 of the selected product offered by the seller, information 225 about the seller, and information 230 regarding the seller's offer of the selected product. In addition, each entry includes two user-selectable controls 235 and 240 in this example, including an "Add to Cart" control 235 to select the item for a possible future order. The user may also select the "Contact this seller" control 240 if the user desires to initiate an electronic communication with the seller.

In this example, the user selects the "Contact this seller" control 240c in order to initiate contact with seller Bob_Smith, who in this example offers a new copy of Book 1 priced at $12.45. After the user selects the "Contact this seller" control 240c, the Web page illustrated in FIG. 2B is provided to the user to allow the user to specify the electronic communication to the seller, which in this example is an email. While not illustrated here, in some embodiments the user may be asked to login to the user's marketplace account if not already logged in, such as to enable identification of the user so that the electronic marketplace may enable responses back to the user. The Web page illustrated in FIG. 2B includes a "To" field 245, "From" field 250, "Item" field 255, "Subject" field 260, user-editable text box 265, "Send" user-selectable control 270, and "Cancel" user-selectable control 275. Although not illustrated in FIG. 2B, in some embodiments a user-selectable control may also be displayed to allow the user to either authorize release of the user's email address to the recipient(s) of the communication, or to prevent such access to the user's email address. In this example, the "To" field 245 and "Item" field 255 may be automatically pre-populated using information from the user's selection in FIG. 2A, and the "From" field 250 may be automatically pre-populated based on the information associated with the user's marketplace account. In other embodiments, the "From" field may not be displayed, or may include an automatically generated email address that will direct a response communication back to the electronic marketplace for forwarding to the user. Furthermore, in some embodiments, the contents of the "From" field displayed to the sender may be different than the contents of the "From" field displayed to a recipient after the communication is sent. For example, the sender's actual email address may be displayed to the sender as part of FIG. 2B, but a distinct automatically generated unique email address for the sender and/or for the current communication (or group of related communications) may be used to replace the sender's actual email address before the communication is delivered or otherwise made available to a recipient. Furthermore, in some embodiments, each distinct recipient for a communication may be provided a distinct automatically generated email address for the sender, such as to facilitate distinct tracking of responses to the sender from the various recipients. In addition, at least some automatically generated email addresses may in some embodiments be valid for only limited times (e.g., a particular period of time; a certain number of communications; a group of related communications, such as an initial communication and any responses back and forth; etc.), so that later attempted fraudulent activities regarding such an automatically generated email address may be inhibited (e.g., if an unscrupulous user later obtains unauthorized access to a user's account and attempts to send communications to other users with whom the user previously communicated). In some embodiments, the determination as to whether to use an automatically generated email address or the sender's actual email address in a communication provided to a recipient may be based at least in part on a selection made by the user regarding whether to make available or block the sender's actual email address, and/or based on policies and configuration of the Communication Manager system (e.g., by using automatically generated email addresses to ensure that at least some types of communications occur via the electronic marketplace as an intermediary). In this example, the user specifies a subject in "Subject" field 260, and specifies the contents of the communication intended for the seller in text box 265, with example contents shown in FIG. 2B. When the user is ready to submit the communication, the user selects "Send" control 270. On the other hand, if the user wants to cancel submission of the communication, the user selects "Cancel" control 275. In this example, the user submits the communication shown on July 31 at 2:09 a.m. The communication specified in FIG. 2B is then provided to an embodiment of the Communications Manager system to assess the communication before it is made available to the intended seller recipient (Bob_Smith in this example) to determine whether it is a suspect communication.

As previously noted, in some embodiments the Communication Manager system uses one or more fraud assessment tests that assess the presence (or absence) of predefined keywords. FIG. 2C illustrates an example of various predefined keywords that are used in this example embodiment, with seven example keywords being shown that each have a corresponding keyword score. In this example, a higher keyword score is more indicative of a suspect communication than a lower keyword score, with a negative keyword score indicating a keyword associated with appropriate communications. It will be appreciated that the number of keywords used may be significantly higher in actual embodiments, and that keyword scores may not be used or may have other forms. In this example, the contents from text box 265 and the information in the "Subject" field 260 of the communication submitted in FIG. 2B are compared to the list of keywords in FIG. 2C, although in other embodiments only the text box contents may be assessed and/or additional associated information may further be assessed. In this example, the keywords "money order", ForeignCountryX, and "payment" are all found in the communication submitted in FIG. 2B, resulting in a combined keyword score of 179. The combined keyword score may then be used as at least part of assessing whether the communication is suspect, as discussed more fully below. In this example, the terms "ForeignCountryX" and "ForeignCountryY" each represent a particular foreign country (not specified), such as countries from which fraudulent communications and fraudulent activities are common.

As previously noted, in some embodiments and situations, a communication that is identified as being suspect may be modified to remove inappropriate content, and then the modified communication may be forwarded to some or all of the intended recipients. For example, with respect to the example communication illustrated in FIG. 2B, the submitted communication may be modified by, for example, deleting the sentence containing the keywords "money orders" and ForeignCountryX, or instead by deleting only those keywords or by deleting the entire paragraph. Furthermore, the email address in the second paragraph may alternatively or additionally be deleted, such as due to being a disallowed form of contact information that may indicate that the sender is attempting to circumvent the use of the electronic marketplace as an intermediary for the communications. The email address and/or other types of contact information (e.g., email addresses) may be automatically identified in various ways, such as using pattern matching, and their presence may further be used in some embodiments as another factor related to whether a communication is assessed as being suspect. As other examples of modifying suspect communications, the modification may include deleting HTML code and/or other types of disallowed information (e.g., scripts and executable code, images, HTML-based and other user-selectable links, references to cause client-side retrieval of information when the communication is displayed, etc.). Furthermore, in at least some embodiments the presence of such disallowed types of information may be used as other factors related to whether communications are assessed as suspect.

In some embodiments, the Communication Manager system uses one or more fraud assessment tests that compare information for the communication to information for one or more prior communications. FIG. 2D illustrates one example of such a prior communication (referred to here as prior communication #1) to which the current communication of FIG. 2B may be compared. As shown in FIG. 2D, prior communication #1 was sent from the same user (i.e., "A. Customer") who submitted the current communication, and in fact the text of prior communication #1 is identical to the first paragraph of the current communication, although the intended recipient of the prior communication was Seller_Ted while the intended recipient of the current communication is Bob_Smith. Prior communication #1 was sent four days previously (i.e., on July 27 versus July 31 for the current communication) and at almost the same time of day (i.e., 2:11 a.m. versus 2:09 a.m. for the current communication). In this example, the Communications Manager system may combine these various factors (along with possible others) to compute a similarity score of 100 for prior communication #1, which indicates a high degree of similarity. As this example demonstrates, many factors combine to form a similarity score. For example, similarities in the content of the communication text, the identity of the user who submitted the communication, the identity of the intended recipient, the date submitted, the time-of-day submitted may be used, as well as various other bases in other embodiments.

FIG. 2E illustrates another example prior communication (referred to as prior communication #2) to which the current communication of FIG. 2B may additionally or alternatively be compared. In this example, the sender and intended recipient of prior communication #2 are different from those of the current communication. However, the subject is the same and both contain the keyword "money order." Also, both communications were submitted at times-of-day that are at least slightly similar (i.e., 3:59 a.m. versus 2:09 a.m. for the current communication). In this example, the Communications Manager system combines these factors (along with possible others) to compute a similarity score of 72 in this example, which indicates a lower degree of similarity with the current communication than the degree of similarity between the current communication and prior communication #1. FIG. 2F illustrates another example prior communication (referred to as prior communication #3) to which the current communication of FIG. 2B may additionally or alternatively be compared. In this example, the sender, intended recipient, subject, and time-of-day are different from those of the current communication, and the Communications Manager system combines these factors (along with possible others) to compute a similarity score of 9 in this example, indicating a low degree of similarity with the current communication. It will be appreciated that similarity scores may be computed in various ways (e.g., in a weighted manner with varying weights for each of the similarity factors considered), and may have various scales and forms.

In addition to computing similarity scores between a current communication and one or more prior communications, some embodiments of the Communications Manager system may further consider whether the prior communications were found to be suspect (e.g., assessed as suspect and/or confirmed as being inappropriate). For example, a high similarity score with prior communication #1 may be sufficient to determine that the current communication is suspect if prior communication #1 was found to be suspect, but may not be sufficient by itself if prior communication #1 was not found to be suspect. Additional details regarding assessments of communications are included below.

FIGS. 2G and 2H illustrate examples of a buyer and seller communicating with one another through use of Communication Manager 110. In this example, Mary Smith's prior communication #3 (illustrated in FIG. 2F) was not found suspect, and thus was forwarded to its intended recipient Seller_Ted. FIG. 2G illustrates Seller_Ted's response to Mary Smith. In this example embodiment, the forwarded email includes a substituted automatically generated email address 280 for Mary Smith that is a unique marketplace identifier to enable Seller_Ted's response to be directed to her through the electronic marketplace and without divulging her personal email address. In some embodiments, Seller_Ted receives Mary Smith's original communication (prior communication #3) and submits his response using a standard email program. In other embodiments, Seller_Ted receives prior communication #3 by logging onto his marketplace account, in which case he may submit his response via a Web form similar to that of FIG. 2B. In some embodiments, the Communications Manager system first assesses the response in FIG. 2G to determine whether it is a suspect communication before forwarding it to its intended recipient, and in this example the response is forwarded to Mary Smith after being determined to not be suspect.

FIG. 2H next illustrates a response of Mary Smith to Seller_Ted's response. Similar to FIG. 2G, Seller_Ted's actual email address is replaced with a unique marketplace identifier 285 for use by Seller_Ted during his communications with Mary Smith so that a response may be directed to him through the electronic marketplace without divulging his personal email address. As previously noted, in some embodiments unique marketplace identifiers may expire after a period of time, while in other embodiments they may be permanently valid. Similar to FIG. 2G, Mary Smith may send this response through a standard email program or while logged onto her marketplace account.

Some embodiments of the Communications Manager system may provide further advantages to assessing communications to identify suspect communications. As noted above, privacy is provided when unique identifiers are provided rather than email addresses. Additionally, in some embodiments, records of the communications between buyers and sellers may be stored for various useful purposes. First, prior communications provide a basis for comparison with current communications, as described above in relation to FIGS. 2D-2F. Second, prior communications sent between buyers and sellers may be used as evidence when resolving disputes between the parties. Third, the electronic marketplace may use monitored communications to track a variety of statistics relating to the buyer and/or the seller. Fourth, if a user is not responding in a timely manner and/or other appropriate manner, the system may automatically take corrective action, such as to escalate the problem to an appropriate human representative of the system or human associated with the user so that the problem is corrected.

In the example of FIGS. 2F-2H, for instance, the buyer uses communication #3 to request that the seller delay shipping the ordered product to a more convenient time for her. The seller responds the next afternoon regarding his willingness to honor the buyer's request and asks for clarification in communication #3*b* of FIG. 2G. The buyer responds a few hours later to provide the requested clarification in communication #3*c* of FIG. 2H. In embodiments in which indication of this sequence of communications is stored, various benefits may be provided for both the buyer and seller. For instance, if the buyer later complains to the marketplace that she did not receive her ordered product for over six weeks, the dispute can be easily resolved by reviewing the stored communications to identify that the delay was at the request of the buyer. Likewise, if the seller does not honor his promise to delay shipment, the buyer can lodge a valid complaint against him, and the marketplace host will be able to verify that he agreed not to ship the product until the specified time.

Various statistics may also be computed from such communications. For instance, Seller_Ted responded to Mary Smith's request within 24 hours, which may be reflected as part of a "timeliness of responses" statistic or other statistics maintained for sellers. Likewise, the fact that Seller_Ted readily agreed to Mary's request may increase his "general reputation" or other statistics. On the other hand, if Seller_Ted has a statistic for "timeliness of shipping ordered products", the record of communications exchanged between he and Mary may be used to prevent her delayed shipment from lowering his statistic since the buyer requested the delay. Such monitored communications may similarly provide a variety of additional benefits.

Figure 3:
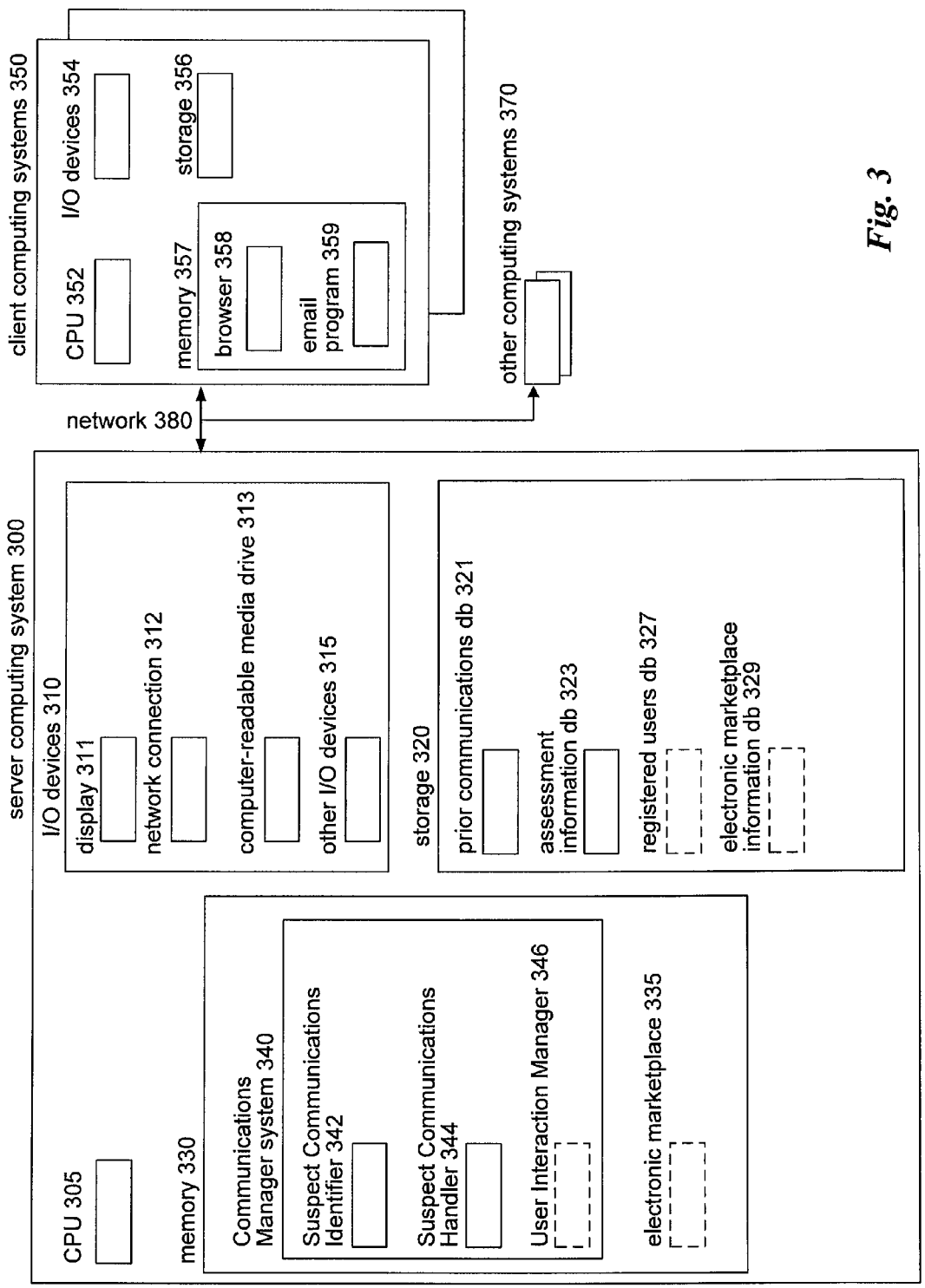
FIG. 3 is a block diagram illustrating an embodiment of a system for automatically identifying and handling suspect electronic communications.

FIG. 3 illustrates a server computing system 300 suitable for executing an embodiment of a Communications Manager system, as well as various client computing systems 350 and other computers 370. The server computing system 300 includes a CPU 305, various I/O components 310, storage 320, and memory 330. The illustrated I/O components include a display 311, a network connection 312, a computer-readable media drive 313, and various other I/O devices 315 (e.g., a mouse, a keyboard, speakers, etc.).

A Communications Manager system embodiment 340 is executing in memory 330, such as to automatically identify and inhibit suspect electronic communications. In the illustrated embodiment, an optional electronic marketplace 335 is also executing in memory 330, with the Communications Manager system interacting with the electronic marketplace to obtain communications to be assessed, although in other embodiments one or more such electronic marketplaces may instead execute remotely (e.g., on one of the other computing systems 370) and interact with the system 340 over the network 380 (e.g., the Internet, or a private communications network). Alternatively, the Communications Manager system may in some embodiments support one or more other types of systems that have communications to be assessed, or some or all of the system 340 components and functionality may instead be integrated as part of a particular electronic marketplace to facilitate the operation of that electronic marketplace. As part of its operation, the electronic marketplace 335 may access and use a variety of types of information in an optional electronic marketplace information database ("db") data structure 329 on storage 320 to assist its operation, such as information about items available to be ordered, about users who are customers (e.g., preferences, payment information, shipping addresses, etc.), about orders that have been placed and current status of fulfillment of those orders, etc.

In the illustrated embodiment, buyer and seller users of various client computing systems 350 interact with the electronic marketplace in order to buy and sell items, such as by using Web browsers 358 executing in memory 357 of the client systems. As previously discussed, the users may further initiate and receive various communications based on interactions with the electronic marketplace, such as communications related to potential or actual transactions involving items. The communications may occur via use of the Web browsers 358 and/or via other email client programs 359 (or other electronic communication programs, not shown) executing in memory 357 of the client systems. Some or all such electronic communications are then provided by the electronic marketplace to the Communication Manager system for assessment.

In the illustrated embodiment, the Communication Manager system 340 includes a Suspect Communications Identifier component 342, a Suspect Communications Handler component 344, and a User Interaction Manager component 346. The Suspect Communications Identifier component 342 assesses received communications to determine whether they are suspect, as described in greater detail elsewhere. As part of the assessment, the component 342 may use various assessment information from an assessment information database data structure 323 on storage 320, such as fraud assessment tests, other inappropriateness tests, assessment scoring and weight information, fraudulence thresholds, etc. The component 342 may in some embodiments and situations use information about prior communications from a prior communications database 321 on storage 320, such as when comparing a current communication to one or more prior communications. When communications are received to be assessed, information about some or all such communications may further be stored in the database 321 for later use, and may in some embodiments be automatically analyzed (e.g., periodically) to identify information to be used in later assessment activities (e.g., to identify keywords and other content associated with suspect communications and/or with non-suspect legitimate communications).

After the Suspect Communications Identifier component 342 determines that an assessed communication is suspect, the Suspect Communications Handler component 344 takes one or more actions to prevent the suspect communication from being made available to the intended recipients, and may further take additional actions to further inhibit fraudulent activities related to the suspect communication. As one example, the Suspect Communications Handler component 344 may block a suspect communication from being provided to some or all intended recipients, or in some situations may modify a suspect communication to remove inappropriate contents. Additional details related to such actions are described elsewhere.

An optional User Interaction Manager component 346 may perform various interactions with users in various situations, such as to send confirmation messages to user who send communications to indicate when the communications are forwarded to intended recipients. In some embodiments, for example, the component 346 may send such confirmation messages when communications are identified as suspect and blocked from being forwarded, such as to prevent users who are sending inappropriate communications from realizing that their communications have been identified as suspect. As described elsewhere, in some embodiments such confirmation messages may be sent to senders at least in part to test the validity of the senders' email addresses or other electronic contact information.

Functionality of the Communications Manager system may be accessed in various ways in various embodiments. As indicated above, in some embodiments the Communications Manager system interacts with one or more electronic marketplaces as part of assessing communications. In other embodiments, a user may interact directly with the Communications Manager system for various purposes, such as for buyers and/or sellers to receive and submit communications and to provide feedback (e.g., acceptance and rejection of proposed modifications), or for administrative users to monitor performance of the system. As noted, some users may interact with Communications Manager system via remote client computing devices, while other users may have physical access to the server computing system 300, and if so can interact with the various I/O devices 310 to provide and/or receive information. Information provided to users of client computer systems can be presented to those users on appropriate I/O devices 354 of those systems. The client computer systems and/or server computing system 300 may also interact with other computing systems 370 for various other purposes.

It will be appreciated that the illustrated computing systems are merely illustrative and are not intended to limit the scope of the present invention. Computing system 300 may instead include multiple interacting computing systems or devices, and may be connected to other devices that are not illustrated, including through one or more networks such as the Internet, via the Web, or via private networks (e.g., mobile communication networks, etc). More generally, a "client" or "server" system may comprise any combination of hardware or software that can interact in the indicated manners, including (without limitation) desktop or other computers, network devices, Internet appliances, PDAs, cellphones, wireless phones, pagers, electronic organizers, television-based systems (e.g., using set-top boxes and/or personal/digital video recorders), and various other consumer products that include inter-communication capabilities. In addition, the functionality provided by the illustrated Communications Manager system components may in some embodiments be combined in fewer components or distributed in additional components, and the functionality of some of the illustrated components may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the Communications Manager system components and/or data structures may also be stored (e.g., as software instructions or structured data) on a computer-readable medium, such as a hard disk, a memory, a network, or a portable media article (e.g., a DVD or flash memory devices) to be read by an appropriate drive or via an appropriate connection. The Communications Manager system components and data structures may also be transmitted as generated data signals (e.g., by being encoded in a carrier wave or otherwise included as part of an analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the described techniques may be practiced with other computer system configurations.

Figure 4:
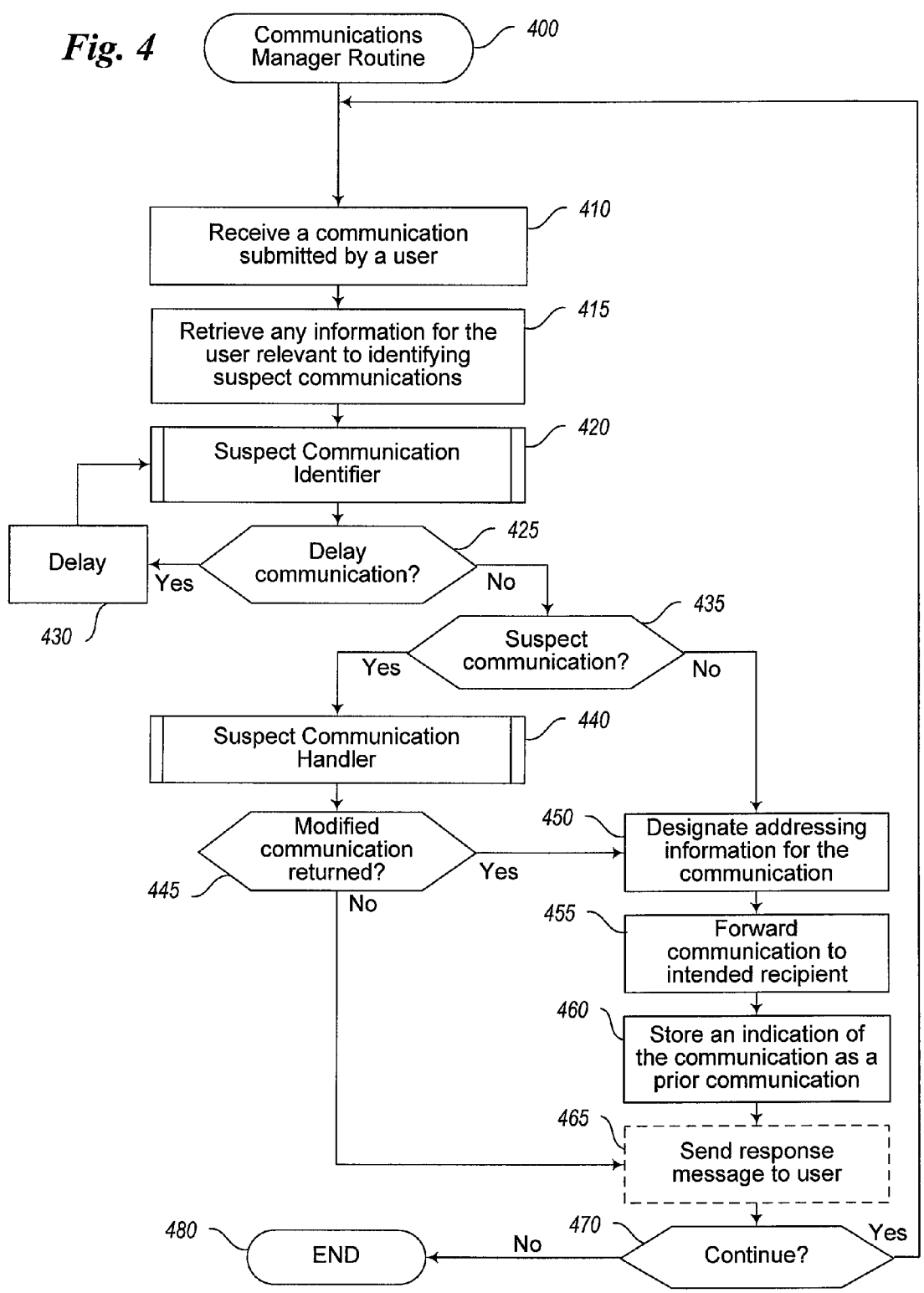
FIG. 4 is a flow diagram of an example embodiment of a Communications Manager routine.

FIG. 4 is a flow diagram of an embodiment of a Communications Manager routine 400. The routine may be provided by, for example, execution of an embodiment of the Communications Manager system 110 of FIG. 1 and/or of the Communications Manager system 340 of FIG. 3. In the illustrated embodiment, the routine operates independently of one or more electronic marketplaces, but interacts with such electronic marketplaces in order to provide appropriate functionality, although in other embodiments some or all of the functionality of the routine could instead be embodied directly as part of an electronic marketplace.

The routine begins at step 410, where a communication submitted by a sender user via an electronic marketplace is received. While not illustrated here, in some embodiments a confirmation message may be immediately sent to the sender user, such as for use in testing whether the indicated communication address of the sender user is valid. In step 415 the routine retrieves information for the user relevant to identifying suspect communications, such as information about prior interactions of the sender with the electronic marketplace, information about fraudulence thresholds or other assessment information to use to assess communications from the user, etc. In some embodiments, such information may be specific to the user and/or to a group of users to which the user belongs, while in other embodiments the same information may be used for all users. The routine then executes subroutine 420 to identify whether the current communication is suspect. The routine then continues to step 425 to determine whether the subroutine returns an indication to delay a decision regarding whether the current communication is suspect. If so, the routine continues to step 430 to delay for a specified period of time (e.g., 20 minutes). After the delay of step 430, the subroutine 420 is executed again to identify whether the current communication is suspect. While not illustrated here, in some embodiments a subsequent execution of the subroutine 420 may use different assessment information, such as based on changes since a prior execution, indications of undeliverability of a confirmation email that may reflect an invalid communication address for a sender user, and/or to alter how the subsequent assessment occurs. This loop continues until a delay is no longer indicated.

If a delay is not indicated at step 425, the routine continues to step 435 to determine whether the communication was identified as being suspect. If so, the routine executes subroutine 440 to handle the suspect communication. After handling the suspect communication, the routine continues in step 445 to determine whether a modified communication was returned from subroutine 440, such as a communication that is modified to not be suspect. If so, or if the communication was not identified as suspect in step 435, the routine continues to step 450 to designate addressing information for the communication. As described in more detail elsewhere, in some embodiments a unique identifier is substituted for the user's email address so that the intended recipient does not gain access to the sender's email address. After addressing information is designated, the routine continues to step 455 and the communication is forwarded to the intended recipient(s). An indication of the communication is then stored as a prior communication in step 460 for later use in identifying suspect communications and/or for other purposes, as discussed in more detail elsewhere.

Next, or if no communication was returned from subroutine 440, a response message is optionally sent to the user who submitted the communication in step 465. In embodiments in which a confirmation message was previously sent upon receipt of the communication, the response message may be in addition to the previously sent confirmation message, or may instead not be sent if a confirmation message was previously sent. In this illustrated embodiment, in the case of a communication that is not identified as suspect, the response message may indicate that the communication has been forwarded to the intended recipient. In the case of a communication that was modified by subroutine 440, the response message may or may not indicate that the communication was modified. While not illustrated here, in some embodiments such notification regarding a modified communication may be made prior to forwarding the modified communication to the intended recipient(s), such as if the communication sender is allowed to approve the modified communication. In the case of a communication that was blocked by subroutine 440, the response message may indicate that the communication was not forwarded to the intended recipient, or the response message may falsely indicate that the communication was forwarded. After step 465, the routine then continues to step 470 to determine whether to continue. If so, the routine returns to step 405, and if not the routine continues to step 480 and ends.

Figure 5:
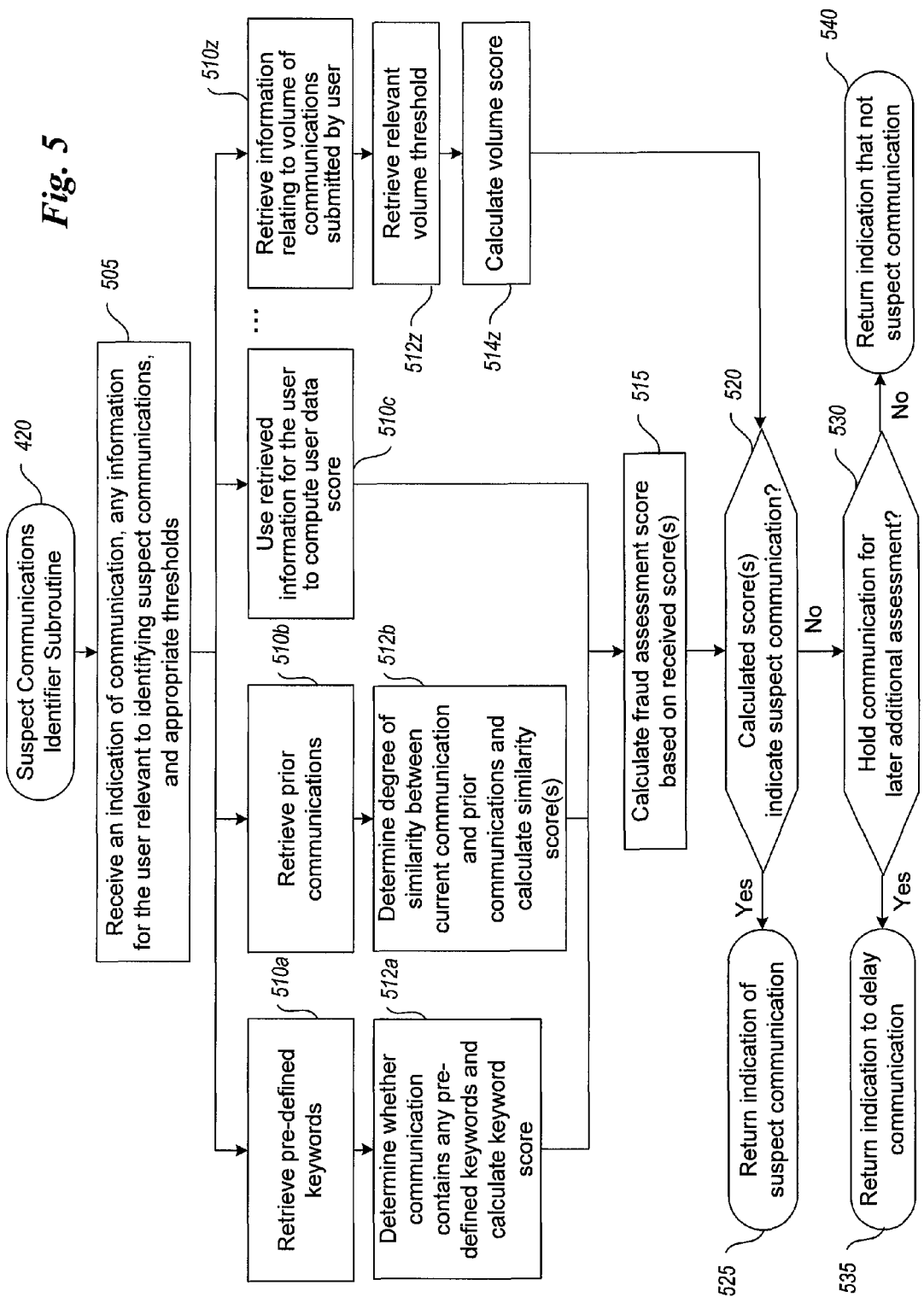
FIG. 5 is a flow diagram of an example embodiment of a Suspect Communications Identifier subroutine.

FIG. 5 is a flow diagram of an embodiment of a Suspect Communications Identifier subroutine 420. The subroutine may be provided by, for example, execution of an embodiment of the Suspect Communications Identifier component 342 of FIG. 3. In the illustrated embodiment of FIG. 5, the subroutine determines whether a current communication is suspect based on the existence of certain keywords contained in the communication, the degree of similarity to prior communications, based on information about the user who submitted the communication, and/or whether the user's volume of communications submitted exceeds a relevant volume threshold. In other embodiments, other factors could be used to identify suspect communications, whether in addition to or instead of the factors shown in FIG. 5.

In the illustrated embodiment, the subroutine begins in step 505, where an indication is received of the current communication, any information for the user relevant to identifying suspect communications, and one or more assessment thresholds to use for determining whether the communication is suspect. The subroutine then continues to steps 510a-510z to initiate assessment of the communication. In particular, in the illustrated embodiment, multiple assessment tests are indicated as occurring in parallel, such that completion of one or more of the assessment tests may be sufficient to determine that a communication is suspect or is not suspect even before other of the assessment tests are completed. In other embodiments, the assessment tests may instead be performed in other manners, such as in a serial manner.

Step 510a retrieves one or more predefined keywords to use as part of one or more keyword-based fraud assessment tests, and in step 512a applies the keyword-based fraud assessment test(s) to the current communication to search for the predefined keywords. In the illustrated embodiment, one or more keyword scores are further calculated for the current communication based on the presence and/or absence of the keywords, as previously discussed.

Step 510b retrieves information about one or more prior communications to use as part of one or more similarity-based fraud assessment tests. In some embodiments, the communications retrieved will be limited to a subset of prior communications, such as communications sent by all users during a particular time period, or on a user-specific basis (e.g., all prior communication submitted by the user within a specified prior period of time, prior communications that satisfy certain specified criteria such as naming the same intended recipient, etc.). After step 510b, the subroutine continues to step 512b to calculate one or more similarity scores indicating the degree of similarity between the current communication and the retrieved prior communications based on applying the similarity-based fraud assessment test(s), as previously discussed. In some embodiments, the similarity analysis will be performed in a manner specific to the current user, while in other embodiments may be performed in a consistent manner for all users or groups of users. As one particular example, in some embodiments each group of a specified number of words (e.g., 4) in a communication is compared to the same-sized group of words in the communication to which it is being compared.

Step 510c uses information for the user retrieved in step 505 to compute one or more user data scores. For example, the user data score may be indicative of how recently a user registered with the marketplace.

Step 510z retrieves information relating to the volume of prior communications submitted by the user to use as part of one or more volume-based fraud assessment tests. In some embodiments, a communication will be identified as being from a particular user based on information indicated by the user regarding their identity (e.g., based on a "from" indicator for an email or other similar type of sender information for other types of communications; based on a previous login or other user identification information supplied by the user; etc.). In other embodiments, other information may be used to identify that a communication is from a particular user or from the same user that sent another prior communication, whether in addition to or instead of user identity information, such as based on information that indicates how and/or from where a communication is sent (e.g., an IP address being used by the sender when the communication is sent; a unique identifier associated with an application being used by the sender when the communication is sent, such as a unique identifier stored for a particular browser application using a browser cookie; etc.). In some embodiments, the volume information retrieved may be limited to the volume of a subset of prior communications submitted by the user, such as on a user-specific basis (e.g., all prior communication submitted by the user within a specified prior period of time, prior communications that satisfy certain specified criteria such as naming the same intended recipient, etc.). After volume information is retrieved in step 510z, the subroutine continues to step 512z to retrieve information about one or more volume thresholds to use with the volume-based assessment test(s). In some embodiments, the same volume threshold may be used for all communications, regardless of the user that submitted the communication. In other embodiments, volume thresholds may differ depending upon one or more characteristics of the user submitting the communication and/or of the communication. After the volume threshold(s) are retrieved in step 512z, the subroutine continues to step 514z to apply the volume-based assessment test(s), as previously discussed, and to calculate one or more volume-based assessment scores based on whether the user's volume of communications exceeds the relevant volume threshold(s).

After one or more of steps 512a, 512b, and 510c, the subroutine continues to step 515 to generate an overall fraud assessment score for the communication based at least in part on the received score(s) from steps 512a, 512b, and 510c. For instance, the fraud assessment score may be based at least in part on a keyword score, similarity score, and/or user data score, with the various scores being combined in various ways.

After steps 515 and 514z, the subroutine continues to step 520 to determine whether one or both of the calculated scores from steps 515 and 514z indicate a suspect communication. For example, step 520 may determine whether the fraud assessment score for the current communication exceeds the appropriate fraudulence threshold received in step 505, and if so determine that the communication is suspect. Similarly, step 520 may determine whether the volume-based assessment score for the current communication exceeds the appropriate volume threshold obtained in step 512z, and if so determine that the communication is suspect. In other embodiments, one or more fraud assessment scores and one or more volume-based assessment scores (and optionally other types of assessment scores) may be combined in various ways to determine a single overall assessment score, such as in a weighted manner. If it is determined in step 520 that the communication is suspect, the subroutine continues to step 525 to return an indication that the current communication is suspect, and if not the subroutine continues to step 530. In step 530, the subroutine determines whether to hold the current communication for later additional assessment, such as based on one or more of the assessment scores being above a minimal threshold, based on one or more of the assessment scores otherwise being sufficiently close to a corresponding threshold, and/or based on other factors (e.g., based on the communication being inconsistent with prior patterns of activity by the communication sender, based on not having recently received other communications from the communication sender and delaying the communication to see if it is the first of a large volume of such communications, based on the communication being from a newly registered user, etc.). If step 530 determines to hold the current communication for later additional assessment, an indication to delay the communication is returned in step 535. Otherwise, step 540 returns an indication that the communication is not suspect.

Figure 6:
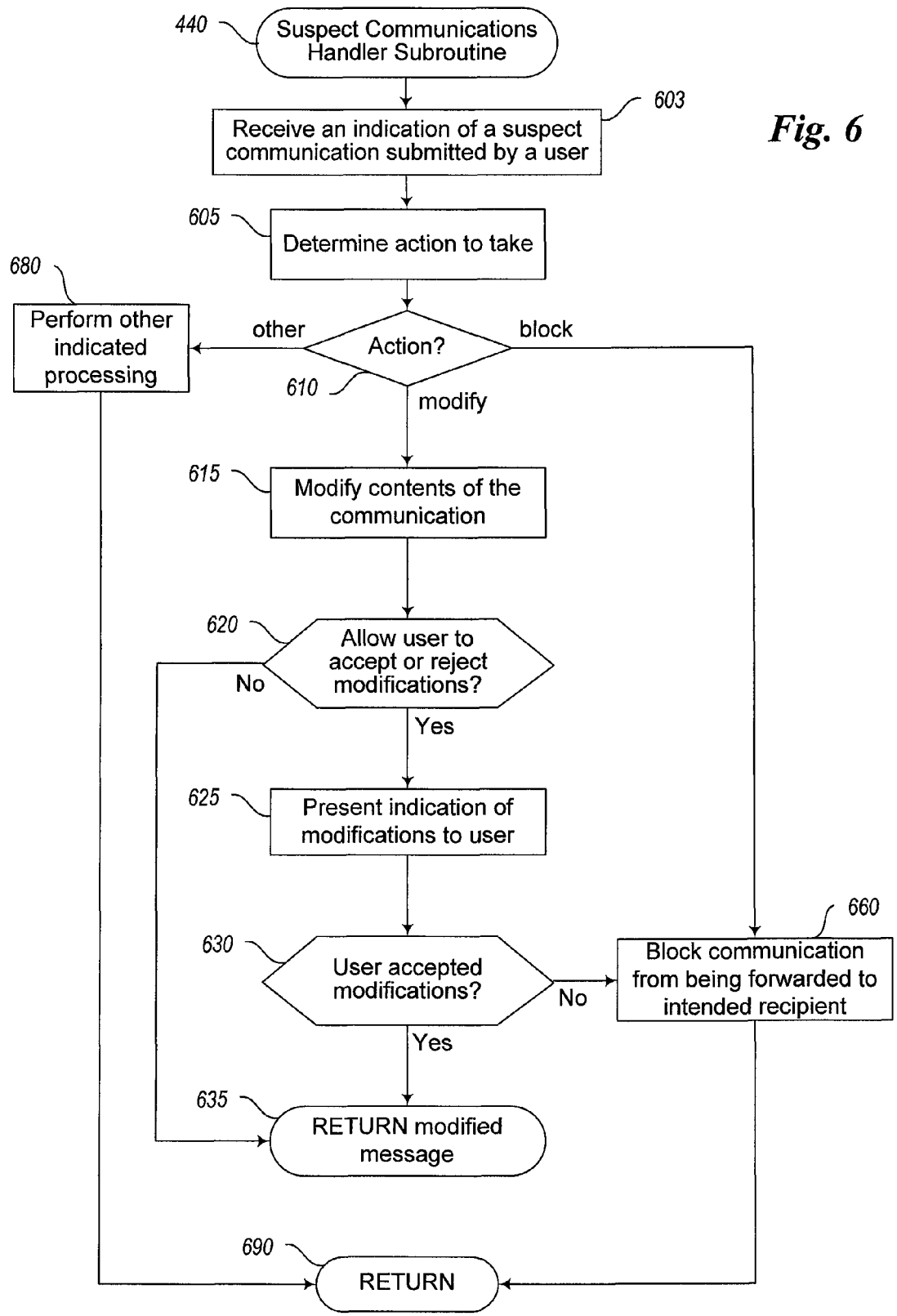
FIG. 6 is a flow diagram of an example embodiment of a Suspect Communications Handler subroutine.

FIG. 6 is a flow diagram of an embodiment of a Suspect Communications Handler subroutine 440. The subroutine may be provided by, for example, execution of an embodiment of the Suspect Communications Handler component 344 of FIG. 3. In the illustrated embodiment, the subroutine determines zero or more appropriate actions to take with regard to a suspect communication. In the illustrated embodiment, the subroutine interacts directly with a user to obtain information, although in other embodiments such information could instead be obtained in other manners (e.g., by obtaining the information from an electronic marketplace with which the user was interacting to submit the communication, with the electronic marketplace optionally interacting with the user).

In the illustrated embodiment, the subroutine begins in step 603, where an indication is received of a suspect communication submitted by a user. In step 605, the subroutine then determines an action to take regarding the suspect communication. In the illustrated embodiment, the actions include blocking the suspect communication and modifying the suspect communication, although in other embodiments a variety of additional types of actions may be performed. The determination of what action(s) to perform may be made in various ways, such as based at least in part on how or why the communication was determined to be suspect (e.g., if the communication is amenable to modification that will remove inappropriate information) and/or on information about the communication sender, as discussed elsewhere.

If step 605 determines to modify the contents of the suspect communication, the subroutine continues to step 615 to perform the modifications. Modifications may consist of adding, removing, or otherwise changing the contents of the suspect communication so that the communication is no longer suspect. The subroutine then continues to step 620 to determine whether to allow the user who submitted the suspect communication the opportunity to accept or reject the modifications. If so, the subroutine continues to step 625 to provide information to the sender user about the modifications and to query the user for acceptance or rejection of the proposed modifications. The subroutine continues to step 630 to determine whether the user accepted the proposed modifications. If so, or if it was determined in step 620 that the user should not be allowed the opportunity to accept or reject the modifications, the modified message is returned in step 635. On the other hand, if the user did not accept the proposed modifications in step 630 or if it was determined in step 605 that the suspect communication should be blocked, the subroutine continues to step 660 to block the communication from being forwarded to the intended recipient(s). After blocking the suspect communication, the subroutine returns in step 690.

If it is determined in step 605 that other indicated processing should be performed relative to the suspect communication, the subroutine performs the indicated processing in step 680, and then returns in step 690.

Those skilled in the art will also appreciate that in some embodiments the functionality provided by the routines and subroutines discussed above may be provided in alternative ways, such as being split among more routines or consolidated into fewer routines. Similarly, in some embodiments illustrated routines and subroutines may provide more or less functionality than is described, such as when other illustrated routines or subroutines instead lack or include such functionality respectively, or when the amount of functionality that is provided is altered. In addition, while various operations may be illustrated as being performed in a particular manner (e.g., in serial or in parallel, or synchronously or asynchronously) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered. For instance, suspect prior communications may be stored in a separate database than non-suspect prior communications.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method for automatically inhibiting fraudulent messages between buyers and sellers, the method comprising:

providing, by one or more configured computing systems, an electronic marketplace that acts as an intermediary between buyers and sellers of items so as to enable the buyers and sellers to engage in transactions involving the items, the electronic marketplace further providing capabilities for buyers and sellers to exchange messages related to transactions; and for a message sent by a buyer or by a seller, before forwarding the message to an intended recipient for the message, automatically determining whether the message is likely to be fraudulent, by:

automatically computing a fraud assessment score for the message based on applying, by the one or more configured computing systems, multiple fraud assessment tests to the message, the multiple fraud assessment tests including at least one keyword assessment test to assess presence of one or more predefined keywords in the message and including at least one similarity assessment test to assess similarity between the message and previously received messages and including at least one of a group that includes a test based on a length of time that the sender has been registered with the electronic marketplace and that includes a test based on a number of prior transactions in which the sender has engaged within the electronic marketplace; and automatically determining that the message is likely to be fraudulent if the computed fraud assessment score for the message exceeds a selected fraudulence threshold, and wherein the message is automatically blocked from being forwarded to the intended recipient for the message if the message is automatically determined to be likely to be fraudulent.

2. The method of claim 1 further comprising, if it is not determined that the message is likely to be fraudulent, forwarding the message to the intended recipient.

3. The method of claim 1 wherein, if it is automatically determined that the message is likely to be fraudulent, the automatic blocking of the message from being forwarded to the intended recipient includes performing at least one of a group including modifying the message before forwarding the modified message to the intended recipient, holding the message for a temporary period to allow further assessment of the message, and permanently preventing the message from being forwarded to the intended recipient.

4. The method of claim 1 further comprising, automatically determining that the message is likely to be fraudulent, and after that automatic determining:

automatically blocking the message from being forwarded to the intended recipient for the one message;

automatically modifying the message by removing from the modified message an electronic address of the buyer or seller who sent the message that was included in the message before the modifying;

querying the buyer or seller who sent the message for a response indicating whether the modified message is accepted by the buyer or seller who sent the message; and if the modified message is accepted, forwarding the modified message to the intended recipient on behalf of the buyer or seller who sent the message.

5. The method of claim 1 wherein the assessing of the similarity between the message and the previously received messages includes assessing similarity in one or more of a group that includes message contents, identities of message senders, identities of message intended recipients, and times of day that messages were sent.

6. The method of claim 1 further comprising, before forwarding the message to the intended recipient, automatically determining whether the message is likely to be inappropriate in one or more manners other than being fraudulent, by:

automatically computing an inappropriateness assessment score for the message by applying at least one volume assessment test to the message to assess whether a volume of messages previously received from the sender of the message within a predetermined prior period of time exceeds a selected message volume threshold; and if the computed inappropriateness assessment score for the message exceeds the selected message volume threshold, automatically blocking the message from being forwarded to the intended recipient.

7. The method of claim 1 further comprising automatically selecting one of multiple fraudulence thresholds to use for the message based at least in part on a sender of the message.

8. The method of claim 1 wherein the multiple fraud assessment tests further include multiple contact information assessment tests to each assess whether the message includes a disallowed type of contact information that is one or both of telephone numbers and email addresses, and further include multiple other tests to assess whether the message includes a disallowed type of user-selectable link to external information, whether the message includes a disallowed type of reference to initiate retrieval of external information when presented, whether the message includes a disallowed type of information, and whether the message is in a disallowed form.

9. The method of claim 1 further comprising tracking information about multiple messages sent from the buyers and the sellers to enable later providing of additional functionality to buyers and sellers based on messages that were previously sent.

10. A computer-implemented method for inhibiting fraudulent communications between participants in an electronic marketplace, the method comprising:

providing, by one or more configured computing systems, capabilities that enable multiple participants in an electronic marketplace to inter-communicate via the electronic marketplace to facilitate transactions involving the participants, each of the participants in the electronic marketplace having an associated electronic address external to the electronic marketplace that is usable in sending electronic communications to that participant;

receiving a communication from a sender that is intended for a recipient, each of the sender and the recipient being one of the multiple participants;

automatically assessing, by the one or more configured computing systems, the received communications by applying one or more fraud assessment tests to the communication and by computing a fraud assessment score for the communication based on the applied one or more fraud assessment tests, the one or more fraud assessment tests including a test based on a length of time that the sender has been registered with the electronic marketplace and/or a test based on a number of prior transactions in which the sender has engaged within the electronic marketplace;

automatically determining, by the one or more configured computing systems, whether the assessed communication is a suspect communication based at least in part on whether the computed fraud assessment score exceeds a fraudulence threshold; and if it is determined that the assessed communication is not a suspect communication, forwarding, by the one or more configured computing systems, the assessed communication to the intended recipient, and otherwise taking one or more actions to inhibit fraudulent activities related to the assessed communication, the forwarding of the assessed communications to the intended recipient including restricting access of the intended recipient to the external electronic address associated with the sender.

11. The method of claim 10 further comprising assessing whether the received communication reflects one or more inappropriate activities by applying one or more volume assessment tests to the received communication that each assesses a volume of prior communications previously sent by the sender within a prior period of time.

12. The method of claim 11 wherein the prior communications are communications that satisfy one or more specified criteria.

13. The method of claim 11 wherein identification of the sender is based on at least one of a group including an identity indicated by the sender, an IP address being used by the sender when the received communication is sent, and a unique identifier associated with an application being used by the sender when the received communication is sent.

14. The method of claim 10 wherein the participants in the electronic marketplace include potential buyers and sellers of items, such that the sender of the assessed communication is a potential buyer or potential seller and the intended recipient of the assessed communication is another potential buyer or potential seller.

15. The method of claim 14 wherein the assessed communication is not determined to be a suspect communication, and wherein the items include one or more products and/or services.

16. The method of claim 10 further comprising providing functionality of the electronic marketplace such that the electronic marketplace acts as an intermediary between the participants as part of the facilitating of the transactions.

17. The method of claim 10 wherein the received communications has multiple intended recipients, and wherein the automatic assessing of the received communications is performed so as to determine whether the communication is likely to reflect fraudulent activities by the sender and/or by one or more intended recipients of the communication, such that a suspect communication is assessed as being likely to reflect the fraudulent activities.

18. The method of claim 10 wherein the one or more fraud assessment tests include one or more keyword assessment tests that each assess presence of one or more predefined keywords in the assessed communication.

19. The method of claim 18 further comprising, before the applying of the one or more keyword assessment tests to the received communication, identifying at least some of the predefined keywords based on presence of the at least some predefined keywords in prior communications that are identified as being fraudulent.

20. The method of claim 18 wherein the applying of one of the keyword assessment tests includes, if one of the predefined keywords for the one keyword assessment test is present in the assessed communication, determining an increased likelihood of the assessed communication being fraudulent based on the one predefined keyword being present.

21. The method of claim 18 wherein the applying of one of the keyword assessment tests includes, if one of the predefined keywords for the one keyword assessment test is present in the assessed communication, determining a decreased likelihood of the assessed communication being fraudulent based on the one predefined keyword being present.

22. The method of claim 10 wherein the one or more fraud assessment tests include one or more similarity assessment tests that each assess one or more types of similarity between the assessed communication and one or more prior communications.

23. The method of claim 22 wherein the one or more prior communications include multiple communications that were previously received within a specified prior period of time.

24. The method of claim 22 wherein the assessing of similarity between the received communication and prior communications includes assessing similarity in one or more of a group that includes communication contents, identities of senders, identities of intended recipients, and times of day of sending communications.

25. The method of claim 10 wherein the one or more fraud assessment tests include one or more assessment tests that each assess whether the assessed communication includes a disallowed type of contact information.

26. The method of claim 10 wherein the one or more fraud assessment tests include one or more assessment tests that each assess whether the assessed communication includes a disallowed type of user-selectable link to external information.

27. The method of claim 10 wherein the one or more fraud assessment tests include one or more assessment tests that each assess whether the assessed communication includes a disallowed type of reference to initiate retrieval of external information when presented.

28. The method of claim 10 wherein the one or more fraud assessment tests include one or more assessment tests that each assess whether the assessed communication includes a disallowed type of information.

29. The method of claim 10 wherein the one or more fraud assessment tests include one or more assessment tests that each assess whether the assessed communication is in a disallowed form.

30. The method of claim 10 wherein the one or more fraud assessment tests include multiple fraud assessment tests that are each one of multiple types, and wherein the computing of the fraud assessment score for the assessed communication is performed in such a manner as to give varying weights to the multiple fraud assessment tests based on the type of the test.

31. The method of claim 10 further comprising selecting the fraudulence threshold for the assessed communication from one of multiple fraudulence thresholds based at least in part on one or more of a group that includes a type of participant in the electronic marketplace of the sender of the assessed communication, a level of participation in the electronic marketplace of the sender of the assessed communication, a recency of participation in the electronic marketplace of the sender of the assessed communication, and an identity of the sender of the assessed communication.

32. The method of claim 10 wherein the assessed communication is determined to be a suspect communication, and wherein the taking of the one or more actions to inhibit the fraudulent activities related to the assessed communication includes one or more of a group including holding the suspect communication until a future time to allow further assessment of the suspect communication at the future time based on additional information that is available at the future time; modifying the suspect communication before forwarding the modified suspect communication to the intended recipient; and blocking delivery of the suspect communication to the intended recipient by not performing forwarding of the suspect communication.

33. The method of claim 10 wherein the automatic assessing of the received communication includes holding the received communication until a future time to allow further assessment of the received communication at the future time based on additional information that is available at the future time.

34. The method of claim 33 wherein the additional information that is available at the future time for the received communication includes validity of an email address of the sender of the received communication, the validity of the sender's email address being determined based at least in part on automatically attempting to send a confirmation message to the sender in order to determine whether the sending of the confirmation message succeeds.

35. The method of claim 10 wherein the assessed communications is determined to be a suspect communication, and wherein the taking of the one or more actions to inhibit the fraudulent activities related to the assessed communication includes modifying the assessed communication so that the modified communication is no longer suspect, querying the sender to indicate whether the sender approves the modified communication, and forwarding the modified communication to the intended recipient if the sender approves the modified communication.

36. The method of claim 10 wherein the assessed communication is determined to be a suspect communication, and wherein the taking of the one or more actions to inhibit the fraudulent activities related to the assessed communication includes blocking delivery of the assessed communication to the intended recipient, and sending a response message to the sender that indicates that the assessed communication is forwarded to the intended recipient.

37. The method of claim 10 wherein the assessed communications is determined to be a suspect communication, and wherein the taking of the one or more actions to inhibit the fraudulent activities related to the assessed communication includes inhibiting use of the electronic marketplace by at least one of the sender and the intended recipient.

38. The method of claim 10 further comprising tracking information about received communications to enable later providing of additional functionality to participants based on previously sent communications.

39. The method of claim 10 further comprising receiving multiple communications from multiple senders intended for multiple recipients, and selecting at least some of the multiple received communications to automatically assess based on the at least some of the multiple received communications satisfying one or more specified criteria.

40. The method of claim 10 wherein the transactions involving the participants are each at least one of a group including a sale, a lease, a rental, and a licensing transaction.

41. A non-transitory computer-readable medium whose contents configure a computing device to inhibit suspect communications between users engaged in transactions, by performing a method comprising:
  obtaining, by the configured computing device, a communications between two or more users engaged in a transaction via an electronic marketplace involving transfer of one or more items, the obtained communications having an electronic address for a sender of the obtained communication to which electronic communications may be sent and having an indication of an intended recipient for the obtained communication;
  assessing, by the configured computing device, the contents of the obtained communications to determine whether the communication appears likely to reflect inappropriate activities by at least one of the sender and the intended recipient, the assessing of the contents including assessing a length of time that the intended recipient has engaged in transactions within the electronic marketplace and/or assessing a number of previous transactions in which the intended recipient has engaged within the electronic marketplace;
  generating, by the configured computing device, a modified version of the obtained communications that lacks the electronic address for the sender of the obtained communication; and
  providing an indication that the obtained communication is determined to be likely to reflect inappropriate activities, the provided indications including the generated modified version of the obtained communication.

42. The non-transitory computer-readable medium of claim 41 wherein the assessing of the contents of the obtained communication includes automatically applying multiple fraud assessment tests to the obtained communication.

43. The non-transitory computer-readable medium of claim 42 wherein the assessing of the contents of the obtained communication is further performed in a manner specific to the sender.

44. The non-transitory computer-readable medium of claim 41 wherein the assessing of the contents of the obtained communication to determine whether the communication appears likely to reflect inappropriate activities includes comparing the communication to prior communications to determine whether the communication differs from the prior communications in one or more predefined ways.

45. The non-transitory computer-readable medium of claim 41 wherein the providing of the indication includes taking one or more actions to prevent the inappropriate activities from occurring.

46. The non-transitory computer-readable medium of claim 41 wherein the transaction involving the transfer of the one or more items is a potential transaction or an actual transaction, and wherein the two or more users engaged in the transaction are participants in the electronic marketplace such that one of the users is a seller of at least one of the items and such that at least one of the users is a buyer of the at least one items.

47. The non-transitory computer-readable medium of claim 41 wherein the computer-readable medium is a memory of the configured computing device.

48. The non-transitory computer-readable medium of claim 41 wherein the contents are instructions that when executed program the configured computing device to perform the method.

49. A computing device configured to inhibit suspect communications between users in an electronic marketplace, comprising:
  one or more processors;
  a first component configured to, when executed by at least one of the one or more processors, receive communications between users in an electronic marketplace related to transactions between the users, each communication having a sender and one or more intended recipients;
  a second component configured to, when executed by at least one of the one or more processors, automatically assess each of at least some of the received communications to determine whether the communication is likely to reflect one or more suspect activities by at least one of the sender of the communication and of one or more of the intended recipients of the communication, the automatic assessment of each of the at least some communications including assessing a length of time that the sender of the communication has been a user of the electronic marketplace and/or assessing a number of prior transactions in which the sender of the communication has engaged; and
  a third component configured to, when executed by at least one of the one or more processors,
  for each assessed communication that is determined to be likely to reflect one or more suspect activities, take one or more actions to inhibit the suspect activities; and
  for each assessed communication that is not determined to be likely to reflect one or more suspect activities, initiating forwarding of the assessed communication to the one or more intended recipients of the communication, the initiated forwarding of each of one or more of the assessed communications including inhibiting access of the one or more intended recipients of the forwarded communication to an electronic address of a sender of the forwarded communication.

50. The computing device of claim 49 wherein the suspect activities are fraudulent activities, wherein the automatic assessment of each of the at least some received communications includes applying one or more fraud assessment tests to the received communication, wherein each of the at least some received communications is between multiple users engaged in a potential and/or actual transaction such that one of the multiple users will provide one or more items to another of the multiple users, and wherein the one or more actions taken to inhibit suspect activities reflected by an assessed communication includes preventing the assessed communication from being provided to the one or more intended recipients of the assessed communication.

51. The computing device of claim 49 wherein each of the first, second and third components includes instructions for execution in memory of the computing device.

* * * * *

UNITED STATES PATENT AND TRADEMARK OFFICE
CERTIFICATE OF CORRECTION

PATENT NO.        : 8,050,983 B1
APPLICATION NO.   : 11/555197
DATED             : November 1, 2011
INVENTOR(S)       : Aaron A. Eakin et al.

It is certified that error appears in the above-identified patent and that said Letters Patent is hereby corrected as shown below:

Column 24, Line 23:
"of the assessed communications to the intended" should read, --of the assessed communication to the intended--.

Column 24, Line 57:
"communications has multiple intended recipients," should read, --communication has multiple intended recipients,--.

Column 24, Line 58:
"automatic assessing of the received communications is" should read, --automatic assessing of the received communication is--.

Column 26, Line 35:
"communications is determined to be a suspect communication," should read, --communication is determined to be a suspect communication,--.

Column 26, Line 53:
"communications is determined to be a suspect communication," should read, --communication is determined to be a suspect communication,--.

Column 27, Line 9:
"communications between two or more users engaged in a transaction" should read, --communication between two or more users engaged in a transaction--.

Column 27, Line 11:
"of the one or more items, the obtained communications" should read, --of the one or more items, the obtained communication--.

Signed and Sealed this
Twenty-sixth Day of June, 2012

David J. Kappos
*Director of the United States Patent and Trademark Office*

CERTIFICATE OF CORRECTION (continued)
U.S. Pat. No. 8,050,983 B1

Column 27, Line 17:
"contents of the obtained communications to determine" should read, --contents of the obtained communication to determine--.

Column 27, Line 27:
"version of the obtained communications that lacks" should read, --version of the obtained communication that lacks--.

Column 27, Line 32:
"the provided indications including the generated" should read, --the provided indication including the generated--.